United States Patent
Ruiz et al.

(10) Patent No.: US 9,168,772 B2
(45) Date of Patent: Oct. 27, 2015

(54) SYSTEM FOR DETECTING INOPERATIVE INKJETS IN PRINTHEADS EJECTING CLEAR INK USING THREE DIMENSIONAL IMAGING

(71) Applicant: Xerox Corporation, Norwalk, CT (US)

(72) Inventors: Erwin Ruiz, Rochester, NY (US);
Jeffrey N. Swing, Rochester, NY (US);
Paul M. Fromm, Rochester, NY (US);
Steven M. Russel, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,312

(22) Filed: Mar. 31, 2014

(65) Prior Publication Data
US 2015/0273914 A1   Oct. 1, 2015

(51) Int. Cl.
| | |
|---|---|
| *B41J 29/393* | (2006.01) |
| *B41J 2/045* | (2006.01) |
| *B33Y 30/00* | (2015.01) |
| *B41J 2/21* | (2006.01) |
| *B41J 2/125* | (2006.01) |

(52) U.S. Cl.
CPC .............. *B41J 29/393* (2013.01); *B41J 2/0451* (2013.01); *B33Y 30/00* (2014.12); *B41J 2/125* (2013.01); *B41J 2/2142* (2013.01); *B41J 2029/3935* (2013.01)

(58) Field of Classification Search
None
See application file for complete search history.

(56) References Cited

U.S. PATENT DOCUMENTS

| | | |
|---|---|---|
| 2004/0012112 A1 | 1/2004 | Davidson et al. |
| 2006/0111807 A1 | 5/2006 | Gothait et al. |
| 2006/0141145 A1 | 6/2006 | Davidson et al. |
| 2007/0070109 A1* | 3/2007 | White et al. ................... 347/19 |
| 2009/0011066 A1 | 1/2009 | Davidson et al. |
| 2010/0151136 A1 | 6/2010 | Davidson et al. |

FOREIGN PATENT DOCUMENTS

WO   03/026876 A2   4/2003

* cited by examiner

*Primary Examiner* — Lisa M Solomon
(74) *Attorney, Agent, or Firm* — Maginot Moore & Beck LLP

(57) ABSTRACT

An apparatus detects inoperative inkjets during printing of three-dimensional objects. The apparatus includes a supply of substrate that is pulled to a position opposite a printhead to enable a test pattern of material to be formed on a portion of the substrate. That portion is then pulled past a laser sensor, which generates measurement data of the material on the portion of the substrate bearing the test pattern. These measurement data are analyzed to detect inoperative inkjets.

9 Claims, 4 Drawing Sheets

SYSTEM FOR DETECTING INOPERATIVE INKJETS IN PRINTHEADS EJECTING CLEAR INK USING THREE DIMENSIONAL IMAGING

TECHNICAL FIELD

The device disclosed in this document relates to printers that produce three-dimensional objects and, more particularly, to accurate detection of inoperative inkjets in such printers.

BACKGROUND

Printing of documents on substrates, such as paper, are well-known. Newer forms of printing now include digital three-dimensional manufacturing, also known as digital additive manufacturing. This type of printing is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. Similar maladies in printheads are known in document printing with printheads. If the operational status of one or more inkjets deteriorates during three-dimensional object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. Even in document printing at high speeds on a moving web, unacceptable images may be produced over a long length of the web and this portion of the web may have to be scrapped.

Although systems have been developed in document printing systems to detect inoperative inkjets, the detection of inoperative inkjets in object printing systems is more problematic. Particularly problematic in both object printing and document printing systems are the use of the clear materials and inks. These materials and inks are difficult to detect by imaging systems because the contrast between the clear inks/materials on the substrates on which they are ejected is low. Consequently, the noise in the image data of the patterns on the substrate makes analysis of the test pattern difficult. An apparatus that enables detection of inoperative inkjets while printing with clear ink or clear materials would enable restorative procedures to be applied during object printing so printing that can produce a properly formed object or document could continue. In this manner, product yield for the printer is improved and its printing is more efficient.

SUMMARY

An apparatus that enables inoperative inkjet detection in three-dimensional printers includes a supply of substrate configured to move substrate to a position opposite a printhead to receive material ejected from inkjets in the printhead, a laser sensor configured to generate electrical signals corresponding to measurements of the material on the substrate, an actuator operatively connected to the supply of substrate to move the substrate past the printhead and the laser sensor, and a controller operatively connected to the actuator and the laser sensor, the controller being configured to operate the actuator to move a portion of the substrate onto which the inkjets in a printhead have ejected material to a position opposite the laser sensor to enable the laser sensor to generate measurements of the material on the portion of the substrate, and to identify inoperative inkjets in the printhead with reference to the measurements received from the laser sensor.

A printer that incorporates the apparatus for detecting inoperative inkjets includes a printhead configured with a plurality of inkjets to eject material, a supply of substrate configured to move substrate to a position opposite the printhead to receive material ejected from the printhead, a laser sensor configured to generate electrical signals corresponding to measurements of the material on the substrate, an actuator operatively connected to the supply of substrate to move the substrate past the printhead and the laser sensor, and a controller operatively connected to the actuator, the laser sensor, and the printhead, the controller being configured to operate the printhead to eject a predetermined number of material drops from each inkjet onto the substrate to enable the predetermined number of material drops to form a test dot for each inkjet on a portion of the substrate, to operate the actuator to move the portion of the substrate with the ejected material to a position opposite the laser sensor to enable the laser sensor to generate measurements of the material on the portion of the substrate, and to identify inoperative inkjets in the printhead with reference to the measurements received from the laser sensor.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

Figure 1:
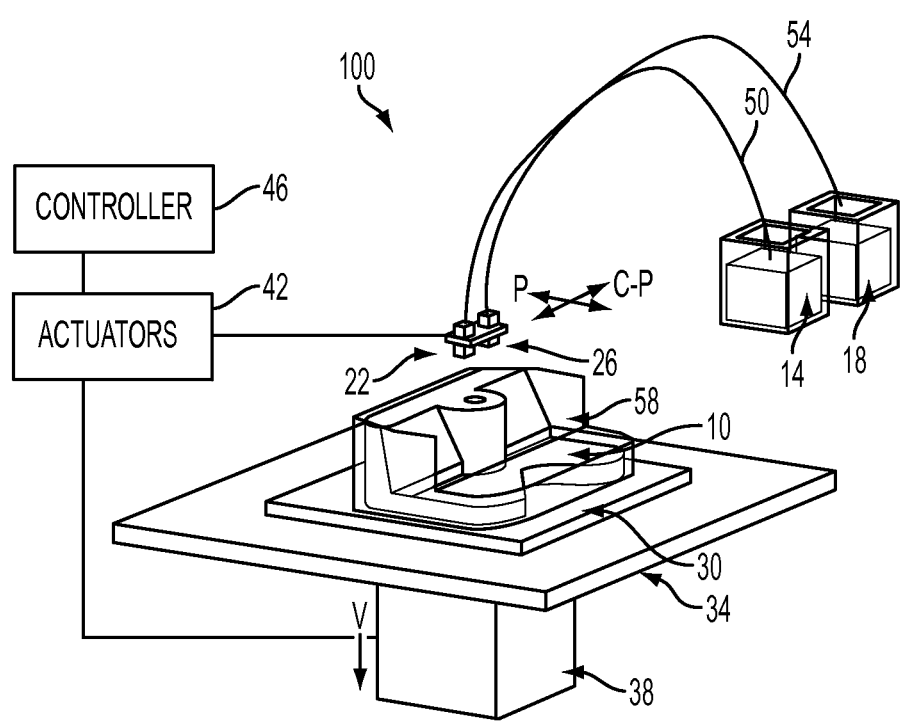
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators to control movement of the planar support member 34 and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to either the planar support member 34 or the columnar support member 38 to move the surface on which the part is being produced in the process and cross-process directions. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the planar support member 34 also move in a direction that is orthogonal to the planar support member 34. This direction is called the vertical direction in this document, is parallel to the columnar support member 38, and is denoted with the letter "V" in FIG. 1. Movement in the vertical direction can be effected by one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
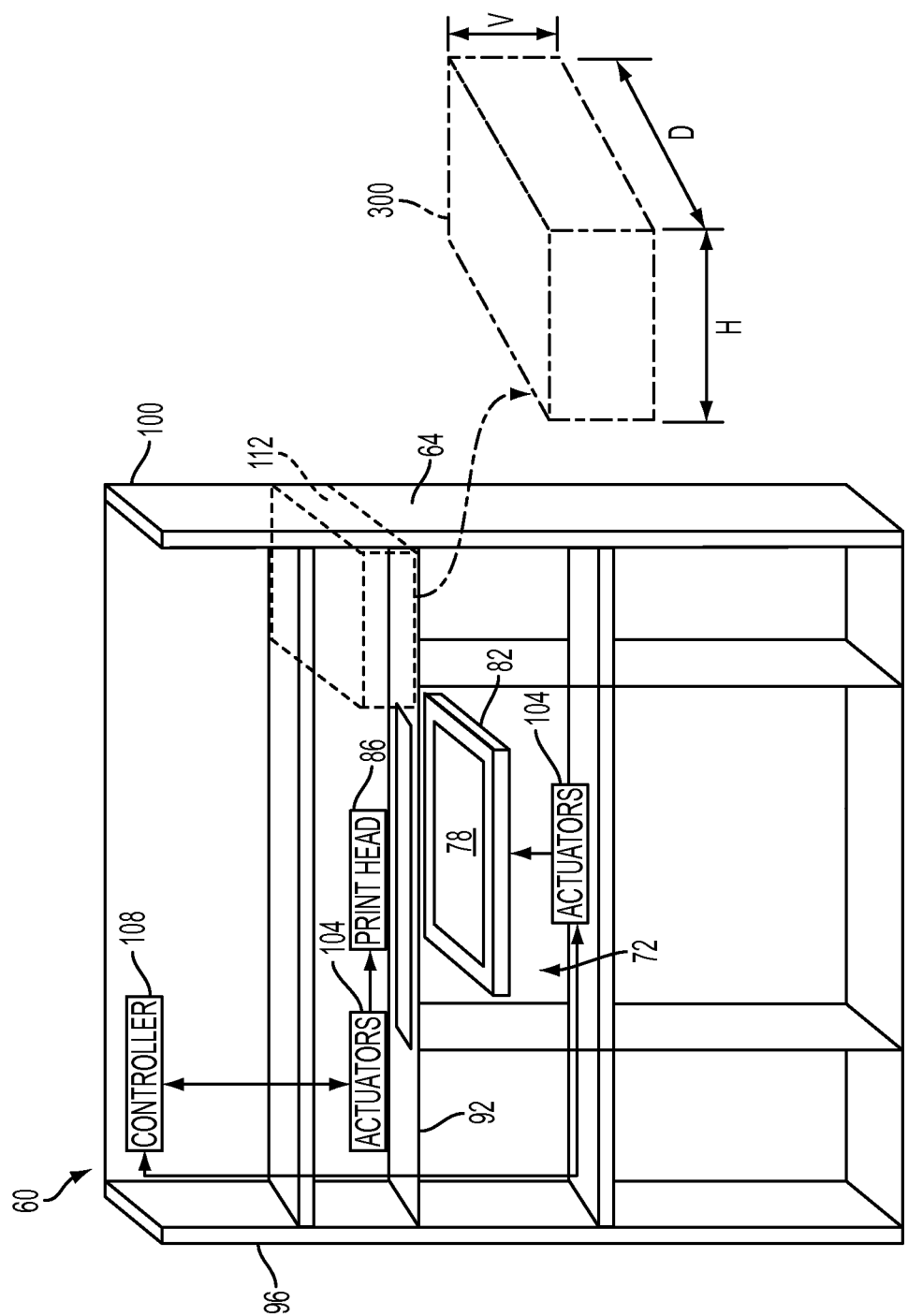
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses laser imaging of a test pattern to detect inoperative inkjets in the printer 60. As noted above, if an inkjet fails during printing of an object by either completely or partially failing to eject material or by errantly ejected material in a skewed direction, the object being produced is malformed. Currently, this malformation cannot be detected until production of the object is finished. By using area 112 for optically sensing inoperative inkjets, printer 60 can be configured to detect inoperative inkjets during object production as described more fully below.

Figure 3:
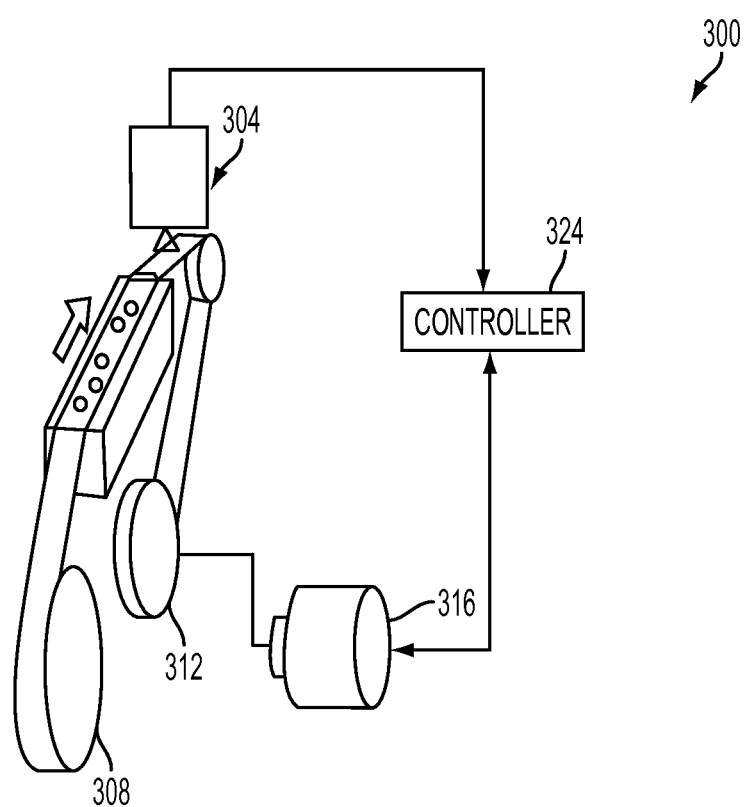
FIG. 3 is a perspective view of a module for detecting inoperative inkjets that fits in the space shown in FIG. 2.

One embodiment of a module that detects inoperative inkjets during object printing is shown in the block diagram of FIG. 3. The module 300 is configured to fit within area 112 of printer 60. The module 300 includes a laser sensor 304, a supply roll of substrate on a roller 308, a take-up roller 312, one or more actuators 316, and a controller 324. The controller 324 is operatively connected to actuators 316 to drive the take-up roller 312 to pull substrate from the supply roller 308. The substrate on the roller 308 can be made of a material that supports the build material and the support material ejected from the printhead 86. For example, the substrate supply roll could be a roll of mylar and, in some embodiments, black mylar to enhance contrast with the materials ejected by the printhead.

Figure 4:
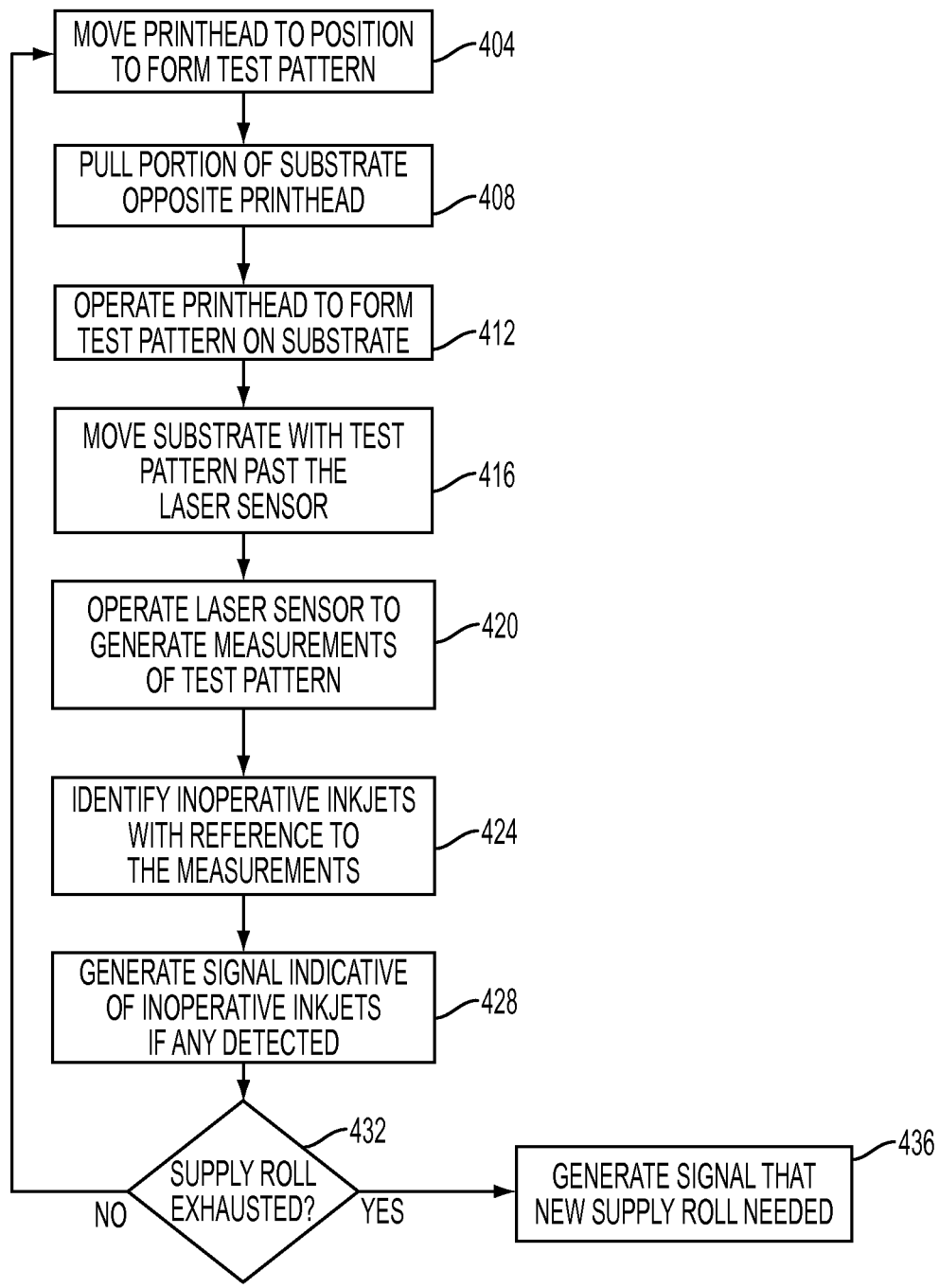
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 324 detecting the printhead in the module 300, controller 324 operates an actuator 316 to rotate take-up roller 312 and pull a clean portion of the substrate from the supply on the roller 308 to a position beneath the printhead 86 (block 408). Controller 324 then generates a signal to the controller 108 to operate the inkjets in the printhead to print a test pattern on the substrate (block 412). In one embodiment, each inkjet in the printhead is repetitively operated to form a pile of material, also called a test dot, on a portion of the substrate 308 opposite the inkjet. After the test pattern is printed, controller 108 moves the printhead 86 out of the module 300 and generates a signal for controller 324. In response to the signal from controller 108, controller 324 operates actuator 316 to move the printed portion of the substrate past the laser sensor 304 (block 416). The laser sensor 304 emits a laser towards the test pattern on the substrate, receives the reflections from the test pattern and substrate, and generates electrical signals corresponding to measurements of the test pattern on the substrate (block 420). These electrical signals are data that are analyzed to identify inoperative inkjets (block 424) and, if inoperative inkjets are identified, a signal indicative of the defective printhead is generated for the operator of the printer (block 428). The operator can then take appropriate action. The controller 324 determines whether the substrate supply roll is exhausted (432) and, if the roll is exhausted, controller 324 generates a signal that the supply of thermal substrate on the roller 308 indicative of that status (block 436). An operator can then remove the take-up roll and replenish the substrate supply on roller 308.

In one embodiment, the optical sensor 304 is a blue laser sensor available from Keyence Corporation of America, Itasca, Ill. in the LJ-V7000 series of two dimensional laser measurement systems. This sensor can generate measurements of the diameters of the material piles formed on the substrate 332 as well as positional data regarding the location of the piles. These data can be used to determine whether the piles are located where they are expected and whether the mass of material is within a predetermined range of tolerance about an expected mass. Measurements that indicate an inkjet is ejecting too much or too little material or is ejecting the material with a skewed trajectory are indicative of inoperative inkjets.

While the embodiments discussed above are within a printer that forms three-dimensional objects, the system that detects inoperative inkjets from the measurments generated by a laser sensor can be used in two dimensional document printing systems, particularly those that use clear inks. Thus, as used in this document, the word "material" refers to substances that can be used for printing documents as well as to form three dimensional objects. In document printing systems, a supply of substrate can be maintained proximate to a printing zone and, from time to time, the printhead moved over a portion of the substrate pulled that supply, printed, and measured with the laser sensor to identify inoperative inkjets. Because the sensor uses a laser to obtain measurements of the ink on the substrate, it is not susceptible to image noise that arises from the low contrast between light or clear inks and a white or nearly white substrate.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a printhead configured with a plurality of inkjets to eject material;
   a supply of substrate configured to move substrate to a position opposite the printhead to receive material ejected from the printhead, the supply of substrate including:
   a first roller, the supply of substrate being wound in a roll mounted about the first roller;
   a second roller to which a loose end of the supply of substrate is attached to enable substrate to be transferred from the first roller by rotation of the second roller;
   a laser sensor configured to generate electrical signals corresponding to measurements of the material on the substrate;
   an actuator operatively connected to the second roller of the supply of substrate, the actuator being configured to rotate the second roller to move the substrate past the printhead and the laser sensor; and
   a controller operatively connected to the actuator, the laser sensor, and the printhead, the controller being configured to operate the printhead to eject a predetermined number of material drops from each inkjet onto the substrate to enable the predetermined number of material drops to form a test dot for each inkjet on a portion of the substrate, to operate the actuator to rotate the second roller to pull substrate from the supply of substrate mounted about the first roller and move the portion of the substrate with the ejected material to a position opposite the laser sensor to enable the laser sensor to generate measurements of the material on the portion of the substrate, and to identify inoperative inkjets in the printhead with reference to the measurements received from the laser sensor.

2. The printer of claim 1, the controller being further configured to detect the supply of substrate mounted about the first roller being exhausted and to generate a signal indicative of the supply of substrate being exhausted to enable the substrate wound on the second roller to be removed and another supply of substrate to be mounted about the first roller.

3. The printer of claim 1, the controller being further configured to identify inkjets that do not eject drops of material of a predetermined size with reference to the measurement data generated by the laser sensor.

4. The printer of claim 1 wherein the printhead is configured to drop build material to form three-dimensional objects.

5. The printer of claim 1 wherein the laser sensor is configured to measure a diameter for each test dot on the portion of the substrate onto which the material from the printhead was ejected.

6. An apparatus comprising:
   a supply of substrate configured to move substrate to a position opposite a printhead to receive material ejected from inkjets in the printhead, the supply of substrate including:
   a first roller, the supply of substrate being wound in a roll mounted about the first roller;
   a second roller to which a loose end of the supply of substrate is attached to enable substrate to be transferred from the first roller by rotation of the second roller;
   a laser sensor configured to generate electrical signals corresponding to measurements of the material on the substrate;
   an actuator operatively connected to the second roller of the supply of substrate to rotate the second roller and move the substrate past the printhead and the laser sensor; and
   a controller operatively connected to the actuator and the laser sensor, the controller being configured to operate the actuator to rotate the second roller to pull substrate from the supply of substrate mounted about the first roller and move a portion of the substrate onto which the inkjets in a printhead have ejected a predetermined number of material drops from each inkjet in the printhead to form a test dot for each inkjet on the portion of the substrate to a position opposite the laser sensor to enable the laser sensor to generate measurements of the material on the portion of the substrate, and to identify inoperative inkjets in the printhead with reference to the measurements received from the laser sensor.

7. The apparatus of claim 6, the controller being further configured to detect the supply of substrate mounted about the first roller being exhausted and to generate a signal indicative of the supply of substrate being exhausted to enable the substrate wound on the second roller to be removed and another supply of substrate to be mounted about the first roller.

8. The apparatus of claim 6, the controller being further configured to identify inkjets that do not eject drops of a predetermined size with reference to the measurement data generated by the laser sensor.

9. The printer of claim 6 wherein the laser sensor is configured to measure a diameter for each test dot on the portion of the substrate onto which the material from the printhead was ejected.

\* \* \* \* \*